United States Patent
Pani

(10) Patent No.: US 9,654,375 B1
(45) Date of Patent: May 16, 2017

(54) SYSTEMS AND METHODS FOR TESTING NETWORK CONNECTIONS OF A CENTRALLY-CONTROLLED NETWORK

(71) Applicant: Google Inc., Mountain View, CA (US)

(72) Inventor: Ayaskant Pani, Fremont, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 14/554,939

(22) Filed: Nov. 26, 2014

Related U.S. Application Data

(63) Continuation of application No. 13/481,032, filed on May 25, 2012, now Pat. No. 8,908,539.

(51) Int. Cl.
*H04L 12/26* (2006.01)
*H04L 12/24* (2006.01)

(52) U.S. Cl.
CPC ............ *H04L 43/50* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 7,583,667 B2* | 9/2009 | Adhikari | H04L 12/4633 370/389 |
| 8,031,617 B2 | 10/2011 | Mogul et al. | |
| 8,665,699 B2* | 3/2014 | Bellagamba | H04L 41/0677 370/216 |
| 2010/0165849 A1* | 7/2010 | Eisenberg | H04L 12/2697 370/242 |
| 2011/0305150 A1* | 12/2011 | Haver | H04L 12/2697 370/252 |
| 2012/0020361 A1 | 1/2012 | Ueno | |
| 2012/0170575 A1* | 7/2012 | Mehra | H04L 41/00 370/359 |
| 2013/0208621 A1 | 8/2013 | Manghirmalani et al. | |

OTHER PUBLICATIONS

US Notice of Allowance in U.S. Appl. No. 13/481,032 dated Aug. 8, 2014.
US Office Action in U.S. Appl. No. 13/481,032 dated May 15, 2014.

\* cited by examiner

*Primary Examiner* — Anh Ngoc Nguyen
(74) *Attorney, Agent, or Firm* — McDermott Will & Emery LLP

(57) ABSTRACT

A computer network testing process to determine whether, given a network node that is unreachable by communication attempts from a controller on a control-plane network, the network node is still functioning to forward data packets on a data-plane network, or if the network node is fully non-functional on both the control-plane network and data-plane network. In order to make this determination, the testing process identifies a network node that is still reachable by the controller on the control-plane network, identifies a route between the controller and unreachable node, passing through the reachable node, and constructs an encapsulated test packet that is sent along this route. In response to sending the encapsulated test packet, the controller may, upon receipt of a confirmation packet, determine that the unreachable node is still functional on the data-plane network, or if no confirmation packet is received, mark the unreachable node as fully non-functional.

20 Claims, 9 Drawing Sheets

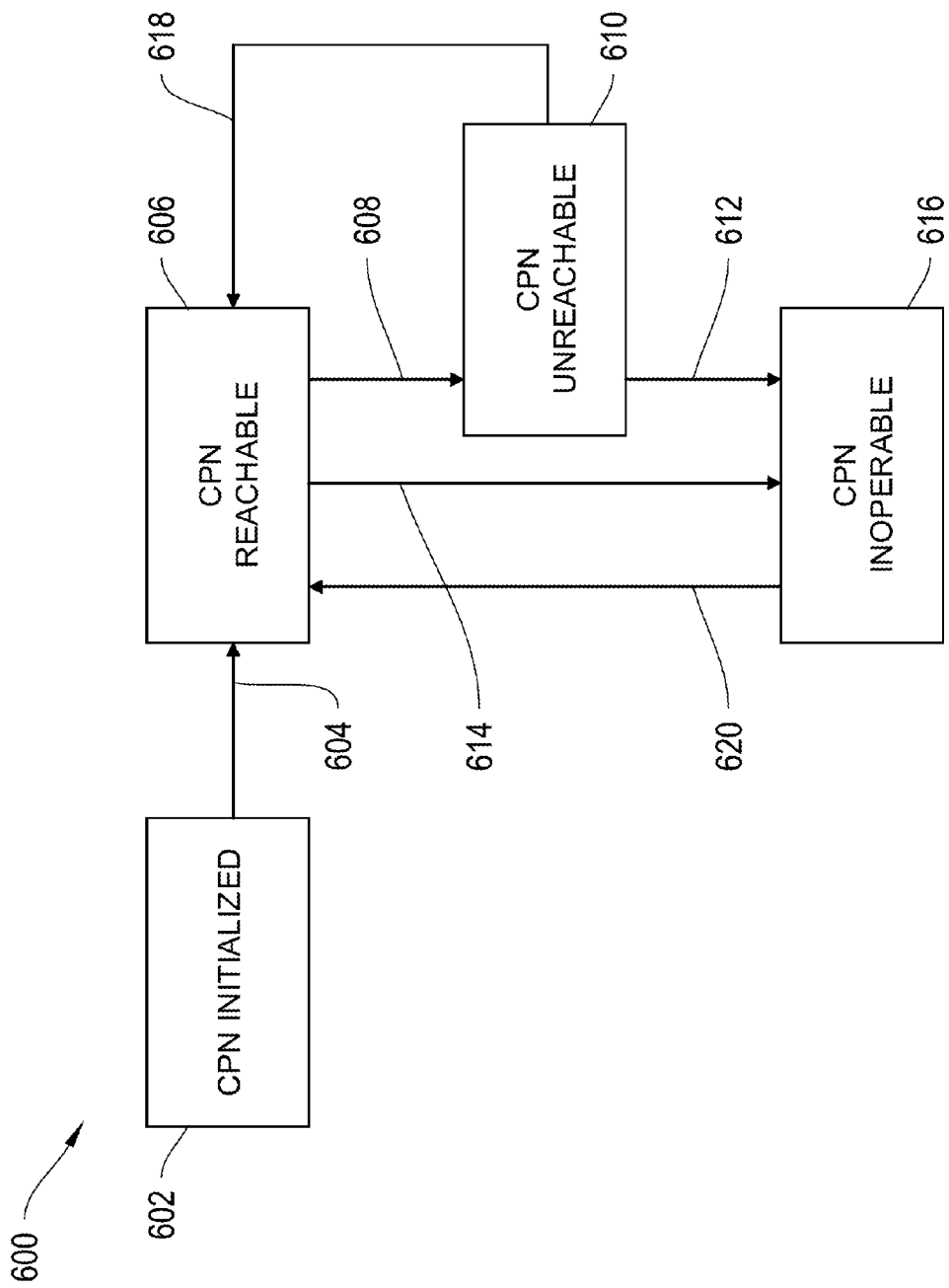

SYSTEMS AND METHODS FOR TESTING NETWORK CONNECTIONS OF A CENTRALLY-CONTROLLED NETWORK

CROSS-REFERENCE TO RELATED APPLICATIONS

This application claims the benefit of U.S. patent application Ser. No. 13/481,032, titled "Systems and Methods for Testing Network Connections of a Centrally-Controlled Network," filed May 25, 2012, issuing as U.S. Pat. No. 8,908,539 on Dec. 9, 2014, and hereby incorporated by reference in its entirety.

TECHNICAL FIELD

The systems and methods described herein relate to computer networks, and particularly, to the testing of the network connections of a centrally-controlled network of nodes and a centralized controller.

BACKGROUND

A network system comprises the hardware and supporting software that directs information between computers. The network itself may be a shared local area network (LAN), wide area network (WAN), metropolitan area network (MAN), the Internet, or any other type of network or communication system suitable for transferring information between computer systems. The network hardware comprises switches, used to connect computers on a common network, and routers, used to make interconnections between networks, where the collection of computers, switches, routers, and other devices used in a network environment, can be referred to as network nodes.

The Open Systems Interconnection (OSI) model is a standardized seven-layer division of the various communication functions included in a network, and incorporates the functions outlined in the four layers of the internet protocol suite (TCP/IP), which is an earlier set of communication protocols used for internet communication. Within the OSI model, data to be communicated on a network is broken down into discrete subdivisions, with each subdivision communicated separately, and re-assembled at a destination. These data subdivisions can be packaged in different ways depending on the layer of the OSI model that is being used, and the packages may be referred to as packets, datagrams, frames, and cells, among others. A packet is a data package associated with the network layer of the OSI model, but is commonly used to refer to a general package of information sent on a network, which is the interpretation that will be used in the description that follows.

The operation of network hardware, such as switches and routers, can be conceptually divided between a data-plane, and a control-plane, where the data-plane comprises the software and hardware that handles the forwarding of data through to another network node. The control-plane, in contrast, comprises the software and hardware that analyzes data packets arriving at, for example, a switch port, and decides what actions should be taken in response to the data packet's arrival. The control-plane maintains a routing table, listing all network addresses reachable from the given switch, and instructs the data-plane as to how to forward the packet.

A software-defined network, as recited by OpenFlow (openflow.org), is a methodology that allows for centralized control of a large network of hardware. The control-plane is removed from the individual switches and routers, and replaced by an OpenFlow agent (OFA) that allows for remote control from a global control-plane, otherwise referred to as a network operating system, OpenFlow Controller (OFC), centralized controller, or simply a controller.

In the description that follows, which refers to a software-defined network, or centrally-controlled network, the control-plane network, or alternatively, the control connections, can be considered the combination of hardware links and supporting software that connect a node to a centralized controller. Related to this, the data-plane network, or alternatively, the data connections, can be considered the combination of hardware links and supporting software that allow for forwarding of packets between nodes.

In some instances the communication channel between the OFC and the OFA in a network node may be disrupted. This may be due to a software, or hardware failure, and may be transient or persistent. In such instances, the OFC cannot communicate with the specific node directly through the control-plane network. However, the node itself, which will be referred to as the unreachable node, may still be functional, and forwarding packets successfully using the data-plane network. Despite this, current methods may respond to the breakdown in communication between OFC and the unreachable node by instructing other network nodes to re-route network traffic, and isolate the unreachable node. This methodology is inefficient, since it potentially burdens other network nodes with increased network traffic while the unreachable node is forwarding data successfully. Without knowing whether a disruption between the OFC and the OFA in an unreachable node is transient or persistent, the OFC can't tolerate the disruption beyond a predetermined waiting period before acting to reroute network traffic around the unreachable node. However, if it could be established that despite the disruption between the OFC and the OFA in a network node, the network node is still able to forward data successfully, then the waiting period within which the OFC waits for communication to be restored to the OFA in the unreachable node may be lengthened, before the OFC implements rerouting in the data-plane network.

As such, there is a need for more efficient systems and methods for verifying the network connections of a centrally-controlled network.

SUMMARY

The systems and methods described herein include, among other things, a computer network testing process to determine whether, given a network node that is unreachable by communication attempts from a controller on a control-plane network, the network node is still functioning to forward data packets on a data-plane network, or if the network node is fully non-functional on both the control-plane network and data-plane network. In order to make this determination, the testing process identifies a network node that is still reachable by the controller on the control-plane network, identifies a route between the controller and unreachable node, passing through the reachable node, and constructs an encapsulated test packet that is sent along this route. In response to the encapsulated test packet being sent, the controller may, upon receipt of a confirmation packet, determine that the unreachable node is still functional on the data-plane network, or if no confirmation packet is received, mark the unreachable node as fully non-functional.

In another implementation, the process may construct the encapsulated test packet so that it can only travel along one specific network route between the controller and the unreachable node.

The process may have an encapsulated test packet processor, for constructing an encapsulated test packet in a controller.

In another implementation, the process may have an encapsulated test packet processor, for constructing an encapsulated test packet in a network node.

The process may wait a predetermined time limit for a confirmation packet from the unreachable node to be received by the controller, and if no confirmation packet is received, mark the network node as non-functional in a network topology table.

The process may determine that a network node is unreachable across a control-plane network if a controller tries to communicate with the network node and does not receive a response during a predetermined probe response time limit.

The process may have a network node determine that a controller is unreachable across a control-plane network if the network node does not receive a probe packet from the controller during a probe receipt time limit.

The process may construct the encapsulated test packet in the controller, and send the encapsulated test packet to an unreachable node through a reachable node by using a control-plane network connection between the controller and the reachable node, and a series of data-plane connections between the reachable node and the unreachable node.

In another implementation, the process constructs the encapsulated test packet in the unreachable network node, and sends the encapsulated test packet to the controller through a reachable node by using a series of data-plane connections between the unreachable node and reachable node, and a control-plane network connection between the reachable node and the controller.

The process may include a confirmation packet in an encapsulated test packet that is constructed by a controller, and the confirmation packet may be returned to the controller after delivery of the encapsulated test packet to an unreachable node, wherein the return of the confirmation packet confirms that an unreachable node is operational on a data-plane network.

The process may also include a confirmation packet in an encapsulated test packet that is constructed by an unreachable node, and the confirmation packet may be delivered to the controller to confirm that the unreachable node is operational on a data-plane network.

The process may use OpenFlow protocol in the controller.

The process may use a tunneling protocol to transmit the encapsulated test packet.

The tunneling protocol may be the Generic Routing Encapsulation protocol.

The tunneling protocol may alternatively be the IP-in-IP protocol.

In another aspect, the system described herein tests network connections of a centrally-controlled network, and the system has a plurality of network nodes connected to each other by data connections, or a data-plane network. The network nodes are controlled by a controller, and connected to the controller by control connections, or a control-plane network. The system uses a network topology lookup table to store the data connections between network nodes, and an encapsulated test packet processor to construct data packets to test network connections between the controller and a network node that is unreachable through control connections. The system also includes a confirmation packet processor which receives data packets returned from the unreachable network node that confirm that the unreachable network node is still operational through data connections.

The system may use the OpenFlow protocol in the controller.

In another implementation, the system constructs the encapsulated test packets so that they can only travel between the controller and a network node along a single network route.

The system may use a tunneling protocol to communicate an encapsulated test packet between a controller and a network node.

In one implementation, the tunneling protocol may be the Generic Routing Encapsulation protocol.

In another implementation, the tunneling protocol may be the IP-in-IP protocol.

BRIEF DESCRIPTION OF THE DRAWINGS

The systems and methods described herein are set forth in the appended claims. However, for purpose of explanation, several embodiments are set forth in the following figures.

FIG. 6 is a state-transition diagram for a centrally-controlled network that uses encapsulated test packets to test network connections.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form to not obscure the description with unnecessary detail.

In one implementation, the systems and methods described herein include, among other things, a computer network testing process to determine whether, given a network node that is unreachable to communication attempts from a controller on a control-plane network, otherwise referred to as control connections, the network node is still functioning to forward data packets on a data-plane network, or data connections, or if the network node is fully non-functional on both the control-plane network and data-plane network. In order to make this determination, the testing process identifies a network node that is still reachable by the controller on the control-plane network, identifies a network route between the controller and unreachable node, passing through the reachable node, and constructs an encapsulated test packet that is sent along this route. In response to sending the encapsulated test packet, the controller may, upon receipt of a confirmation packet, determine that the unreachable node is still functional on the data-plane network, or if no confirmation packet is received, mark the unreachable node as fully non-functional.

Figure 1A:
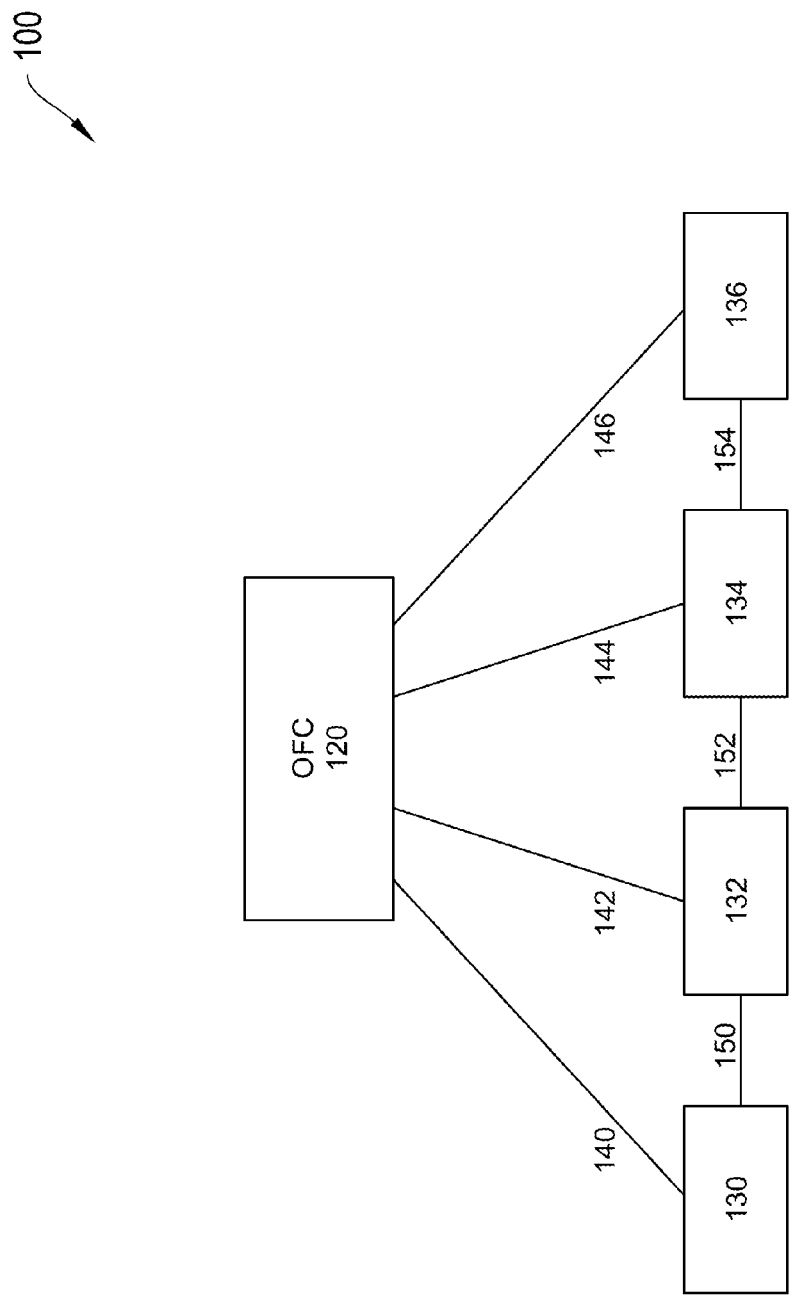
FIGS. 1A and 1B are schematic block diagrams of exemplary centrally-controlled networks in which some embodiments operate.
Figure 1B:
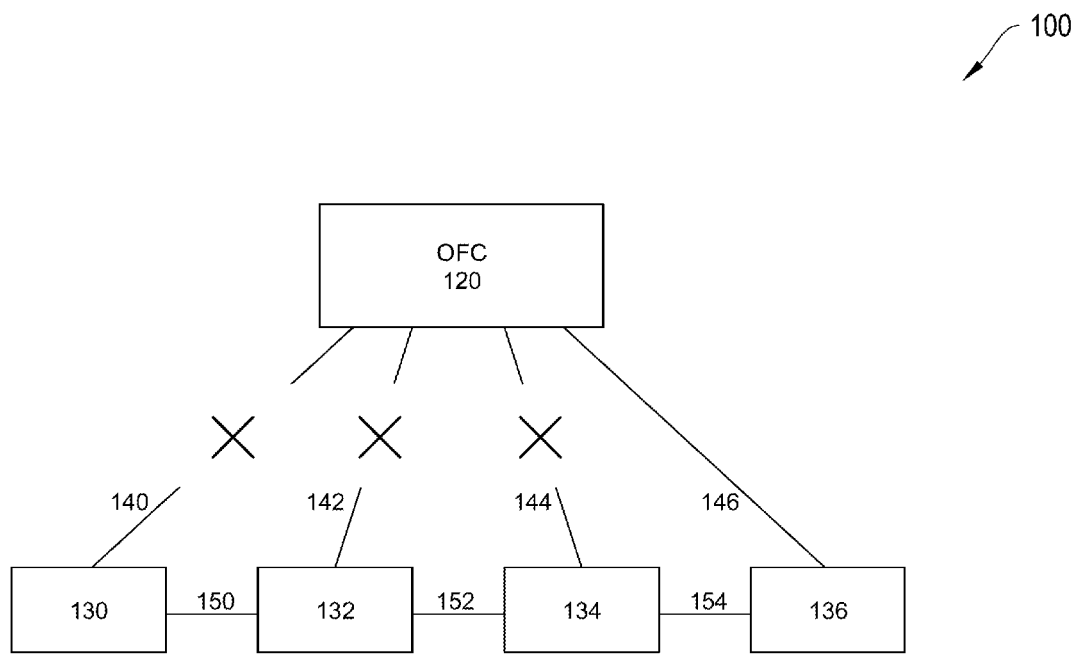

FIGS. 1A and 1B are schematic block diagrams of exemplary centrally-controlled networks in which some embodiments operate. FIG. 1A depicts an OpenFlow network 100, which has an OpenFlow controller (OFC) 120, and four exemplary network switches, 130, 132, 134, and 136, wherein the number of switches controlled by an OFC 120 may be much larger than those four (130, 132, 134, and 136) depicted. It will be apparent to those of skill in the art that the switches (130, 132, 134, and 136) can be generalized as network nodes, without departing from the scope of the implementation, and wherein a network node is, among other things, a switch, a router, or a source or destination computer. Furthermore, the OFC 120, while allowing centralized control of a plurality of network nodes, may not be the only centralized controller within a network. For instances when more than one controller is used in a network, the domain of all network nodes may be split such that only one centralized controller can control a network node, more than one centralized controller can control the network node, or all network controllers can control the network node.

FIG. 1A depicts the control-plane network (CPN) that connects the OFC 120 directly to the respective switches. CPN link 140 connects to switch 130, CPN link 142 to switch 132, CPN link 144 to switch 134, and CPN link 146 to switch 136. Additionally, FIG. 1A depicts the data-plane network (DPN) that connects network nodes to one another. DPN link 150 connects node 130 and 132, DPN link 152 connects nodes 132 and 134, and DPN link 154 connects nodes 134 and 136.

It may be assumed that a network, whether a control-plane network (CPN), or data-plane network (DPN), is composed of network nodes that communicate with one another, physical hardware links between network nodes, and software connections. In the description that follows, it may be assumed that a link refers to the physical hardware used to join network nodes, and a network may be a shared local area network (LAN), wide area network (WAN), metropolitan area network (MAN), the Internet, or any other type of network or communication system suitable for transferring information between computer systems. Ethernet is a common family of technologies using the IEEE standard 802.3 for local area networking (LAN), and Ethernet network hardware links (the physical layer) commonly use a Category 5 (Cat 5) twisted pair Ethernet cable. Alternative hardware link types include, but are not limited to, coaxial cables, twisted-pair cables categorized in order of increasing bandwidth from category 1 to category 7, optical fiber cables, or any other conductor capable of facilitating communication between two network nodes.

The term network "hardware interface" may be used to refer to the combination of the hardware socket on a node, and the plug that terminates a link, and is received by the socket. The interface may be constructed according to, among others, the Registered Jack (RJ) standard, such as the RJ45 interface commonly used on Ethernet cables, or may be an optical fiber connector, which primarily consists of a photo-detector.

It may further be assumed that connections establish software compatibility using a common routing policy between network nodes, and allow transmitted information to be understood at both transmission and receiving ends.

In relation to a network problem, wherein a network node is unreachable through the control-plane network, it is possible that any, or all, of the nodes, links, and connections associated with the unreachable node are at fault, and therefore, upon identifying an unreachable node, the OFC 120 may not be able to determine, without further investigation, whether the unreachable node is associated with a CPN error, and will still be functional on the DPN, or if the node is completely inoperable. If, however, it can be determined that a node on the DPN is still functional, despite a failure in CPN connectivity, then wide-scale re-routing in the DPN can be delayed in anticipation of the CPN failure being transient.

FIG. 1B depicts the OpenFlow network 100 of FIG. 1A, wherein network nodes 130, 132, and 134 are unreachable, due to interrupted CPN connections 140, 142, and 144 respectively. This CPN interruption may occur when, among other things, the CPN network's routes have not converged, or when a network spanning tree protocol is employed and backup link activation is delayed by several seconds. The OpenFlow network 100 of FIG. 1B will be used in the description that follows to demonstrate how the presented systems and methods for testing a centrally-controlled network can be used to determine whether a network node, such as network node 130, is still functional on the DPN, despite not being reachable by the CPN.

Network node 130 may, for example, be a top-of-rack switch in a data center, and connected to a subnet consisting of a plurality of network devices. If switch 130 is unreachable by the CPN through CPN link 140 then the OFC 120, after waiting a predetermined amount of time in anticipation of the problem being transient, will start re-routing network traffic, and isolate switch 130 from the DPN. If, however, it can be determined that the network node 130 is still functional on the DPN, despite being unreachable through CPN link 140, then the OFC 120 can delay updating routes until after a longer waiting period has elapsed without reachability to network node 130 being restored. At this point the OFC 120 may consider the reachability problem as permanent, and proceed to update routes and exclude network node 130 from the DPN.

Figure 2:
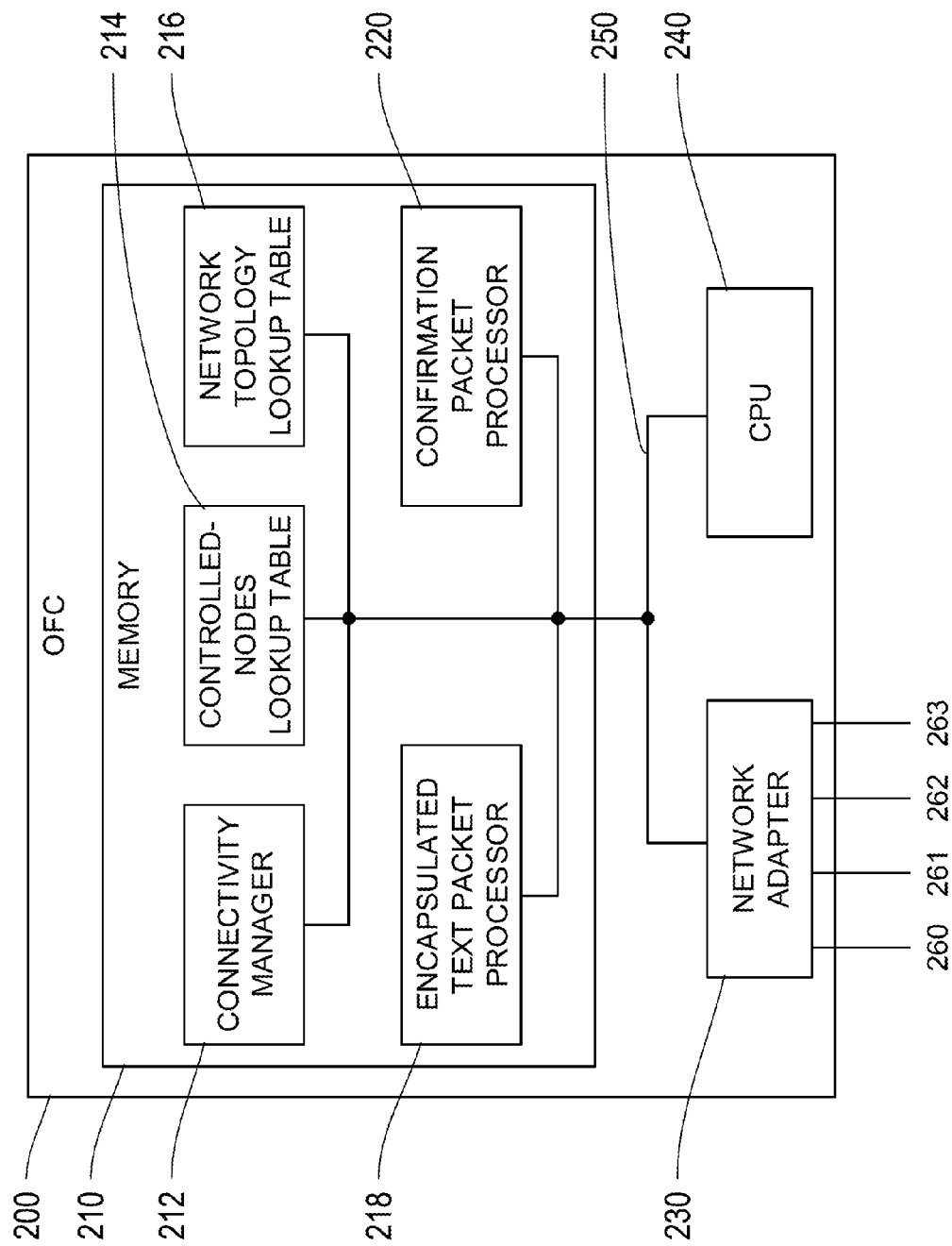
FIG. 2 is a schematic block diagram of an exemplary centralized controller adapted to test network connections.

FIG. 2 is a schematic block diagram of an exemplary centralized controller. In particular, FIG. 2 depicts an OpenFlow controller (OFC) 200 that is implemented to allow for testing of network connections in a centrally-controlled network. The OFC 200 includes a memory 210, a connectivity manager 212, a controlled-nodes lookup table 214, a network topology lookup table 216, an encapsulated test packet processor 218, a confirmation packet processor 220, a network adapter 230, central processing unit (CPU) 240, and system bus 250.

OFC 200 is essentially a computer, adapted for the purposes of remotely controlling network hardware switches. The controller's actions are governed by a CPU 240, which may represent a plurality of processing cores. The hardware interfaces between the OFC 200 and other network nodes are accommodated by the network adapter 230, wherein the network adapter 230 comprises the mechanical, electrical and signaling circuitry to connect the OFC 200 to other network nodes. Network adapter 230 may represent a plurality of network adapters, and the four hardware interfaces 260-263 depicted may represent a larger array of interfaces.

Memory 210 comprises storage locations that are addressable by CPU 240 for storing software program code and data. The memory 210 may comprise a form of random access memory (RAM) that is generally cleared by a power cycle or other reboot operation (e.g., it is a "volatile" memory). In other embodiments, however, the memory 210 may be a non-volatile memory that does not require power to maintain information. The CPU 240 and adapters may, in turn, comprise processing elements and/or logic circuitry configured to execute the software code and manipulate the data stored in the memory 210. Memory 210 further stores the program code that, in this implementation, provides the operations of an OFC 200.

Connectivity manager 212 implements the OpenFlow protocol necessary for centralized control of a plurality of network switches, as recited by OpenFlow.org. Using the connectivity manager 212, the OFC 200 can (i) send probe packets to check CPN connections between the OFC 200 and a centrally-controlled network node, (ii) send an encapsulated test packet to verify DPN functionality of a network node that unreachable by the CPN to the OFC 200, (iii) remotely program switch forwarding tables, otherwise referred to as flow tables, (iv) send packets on any switch port, and (v) receive packets from any switch port, among other things. The connectivity manager 212, upon attempting to communicate with a network node, such as network node 130 from FIG. 1B, by sending probe packets through CPN link 140, may determine, after waiting a predetermined probe response time limit without receiving an acknowledgement from network node 130, that an error has caused the communication attempt to fail. This network node 130 may then be flagged as unreachable in the controlled-nodes lookup table 214.

The controlled-nodes lookup table 214 maintains a list of all network nodes that are controlled by the OFC 200, in addition to status information for each of the network nodes, wherein the status of a given network node may be (i) "reachable", which means that communication with the network node over the CPN is possible, (ii) "unreachable", which means that CPN communication with the network node is not currently possible but that the problem may be transient, or (iii) "inoperable", which means that the network node is not functioning on the CPN and the problem is assumed to be permanent, hence the network node should not be included in network routes. The OFC 200 may change the status of a given network node from "reachable" to "unreachable" and subsequently to "inoperable" in the controlled-nodes lookup table 214, as discussed above. Additionally, the controlled-nodes lookup table 214 stores a timestamp for each network node, wherein the timestamp corresponds to the last receipt of a confirmation packet or other successful communication with the respective network node.

The controlled-nodes lookup table 214 may be used, after the connectivity manager 212 determines that a given network node, such as network node 130 from FIG. 1B, is unreachable by the CPN, such as by CPN link 140, to find another network node that is reachable from the OFC 200, such as network node 136. The connectivity manager 212 may then be used to confirm that the CPN link 146 between the OFC 200 and this chosen network node 136 is still functional by attempting to communicate by sending one or more probe packets to check CPN link 146, and wherein if a probe packet is sent from the OFC 200 to a network node, such as network node 136, without an error, then network node 136 is confirmed as reachable from OFC 200.

The network topology lookup table 216 records the physical links between all network nodes controlled by the OFC 200, such that the table has entries for all network nodes in the controlled-nodes lookup table 214, and stored in an entry for a given network node in the network topology lookup table 216 is a list of all the network nodes directly and physically connected to that given network node. After the connectivity manager 212 determines that a first network node is unreachable through the CPN, and finds a second network node that is reachable from the controlled-nodes lookup table 214, the connectivity manager 212 can use the network topology lookup table 216 to determine a DPN route between the reachable and unreachable nodes, wherein the network topology lookup table 216 can be searched for the reachable node, and from the entry associated with the reachable node, the network topology lookup table 216 entries associated with directly and indirectly connected network nodes to the reachable node can be searched until the unreachable node is found. This search may be performed using, among other methods, a graph search algorithm. Once the unreachable network node is found, the DPN route from the reachable node to the unreachable node is the search path followed in the network topology lookup table 216.

The data-plane network route between the reachable and unreachable network nodes may include a single "hop", wherein a hop can be interpreted as a path between two network nodes, and a single hop exists between two network nodes that are directly-connected to one another. For example, the DPN link 150 between node 130 and node 132 from FIG. 1A represents a single hop. The data-plane network route between the reachable and unreachable network nodes may alternatively consist of multiple hops across a plurality of network nodes between the reachable and unreachable network nodes, such as the two-hop network route between node 130 and node 134 across DPN link 150 and DPN link 152.

The encapsulated test packet processor 218 constructs packets of data to travel along the network route between the OFC 200 and an unreachable network node, such as network node 130 from FIG. 1B, via a reachable network node 136 found in the controlled nodes lookup table 214. The encapsulated test packet processor 218 uses a tunneling mechanism, which may be facilitated by a tunneling protocol, to construct the packets using multiple-levels of encapsulation. Tunneling may, in some implementations, use a delivery packet to transmit a payload through a network, wherein the payload is a packet constructed to transmit data on a network that uses an incompatible protocol. In this way, tunneling packages the payload data such that it is not read until a predetermined network destination. In the implementation described herein, tunneling is employed despite the fact that the payload data is compatible with the network through which it is being transmitted, but to ensure that it is not read until a predetermined destination. The tunneling protocols used may include, among others, Generic Routing Encapsulation (GRE), and IP-in-IP. The route that the encapsulated test packet travels is that determined by the connectivity manager 212 using the network topology lookup table 216, and the encapsulated test packet may be constructed such that it may only follow this predetermined route, in contrast to a general routing protocol, which may allow network nodes to re-route packets in response to local network problems. This methodology allows for greater control over the encapsulated test packets, such that the OFC 200 can determine with confidence whether a prescribed network route is operational or not.

In order to confirm that the encapsulated test packet is successful in travelling through the DPN to the unreachable network node 130, a confirmation packet is encapsulated within the encapsulated test packet. This confirmation packet, upon successful arrival at the unreachable network node, is sent back to the OFC 200. The confirmation packet processor 220, accepts receipt of the confirmation packet within a predetermined time limit, or predetermined acknowledgement time interval, which may be on the order of several hundred milliseconds, of sending the encapsulated test packet. Receipt of the confirmation packet by the confirmation packet processor 220 confirms that the unreachable network node, such as network node 130, is still functional on the DPN, and allows the OFC 200 to delay removing network node 130 from the DPN. During a timeout period, the status of a network node, such as network node 130, remains as "unreachable", but the after determining that the unreachable network node 130 is functional on the DPN, the OFC 200 allows the network node 130 to remain in network routes. During this timeout period, the connectivity manager 212 sends probe test packets to determine if the CPN connection, such as CPN link 140 to network node 130, has been reestablished. If the CPN link 140 is not reestablished during the timeout period, the network node 130 is marked as inoperable in the controlled-nodes lookup table 214, and removed from network routes in the topology table 216.

Note that the timeout period may be multiple times longer than the predetermined acknowledgement time interval in which the confirmation packet processor 220 accepts confirmation packets from an unreachable network node, such as network node 130. During the predetermined acknowledgement time interval a predetermined number of attempts to communicate with the unreachable network node 130 using an encapsulated test packet may be made, and the predetermined number of attempts may be, in one implementation, ten attempts. During this predetermined acknowledgement time interval the connectivity manager 212 may send encapsulated test packets along one or multiple alternative paths between the OFC 200 and the unreachable network node 130, and if no confirmation packet is received by the confirmation packet processor 220, then the status of the unreachable node 130 in the controlled-nodes lookup table 214 is changed to inoperable, and the network topology lookup table 216 is changed to exclude the inoperable network node 130 from network routes, without waiting for the timeout period to elapse.

Figure 4A:
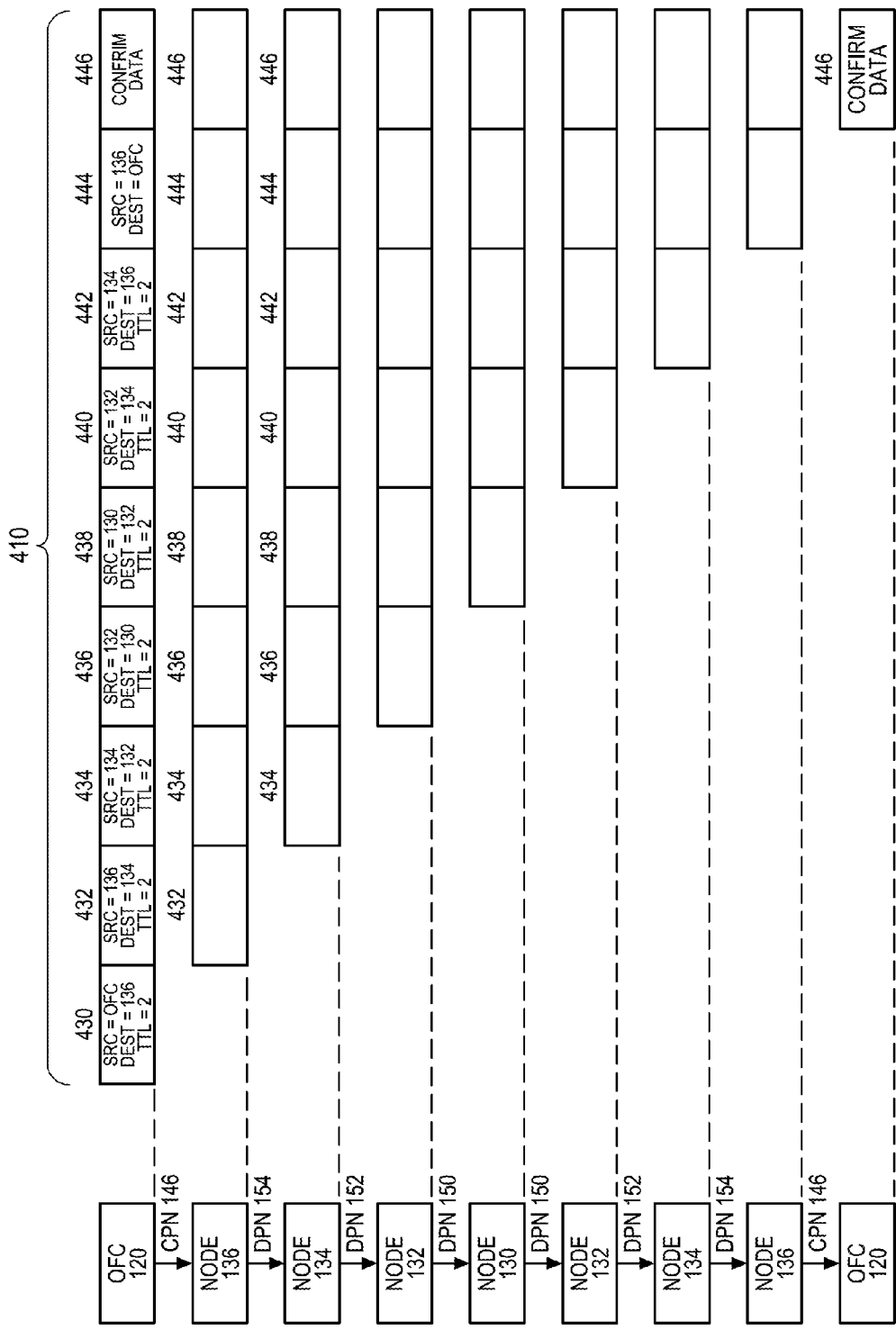
FIGS. 4A, 4B and 4C schematically depict the use of an encapsulated test packet to test a data-plane network connection.
Figure 4B:
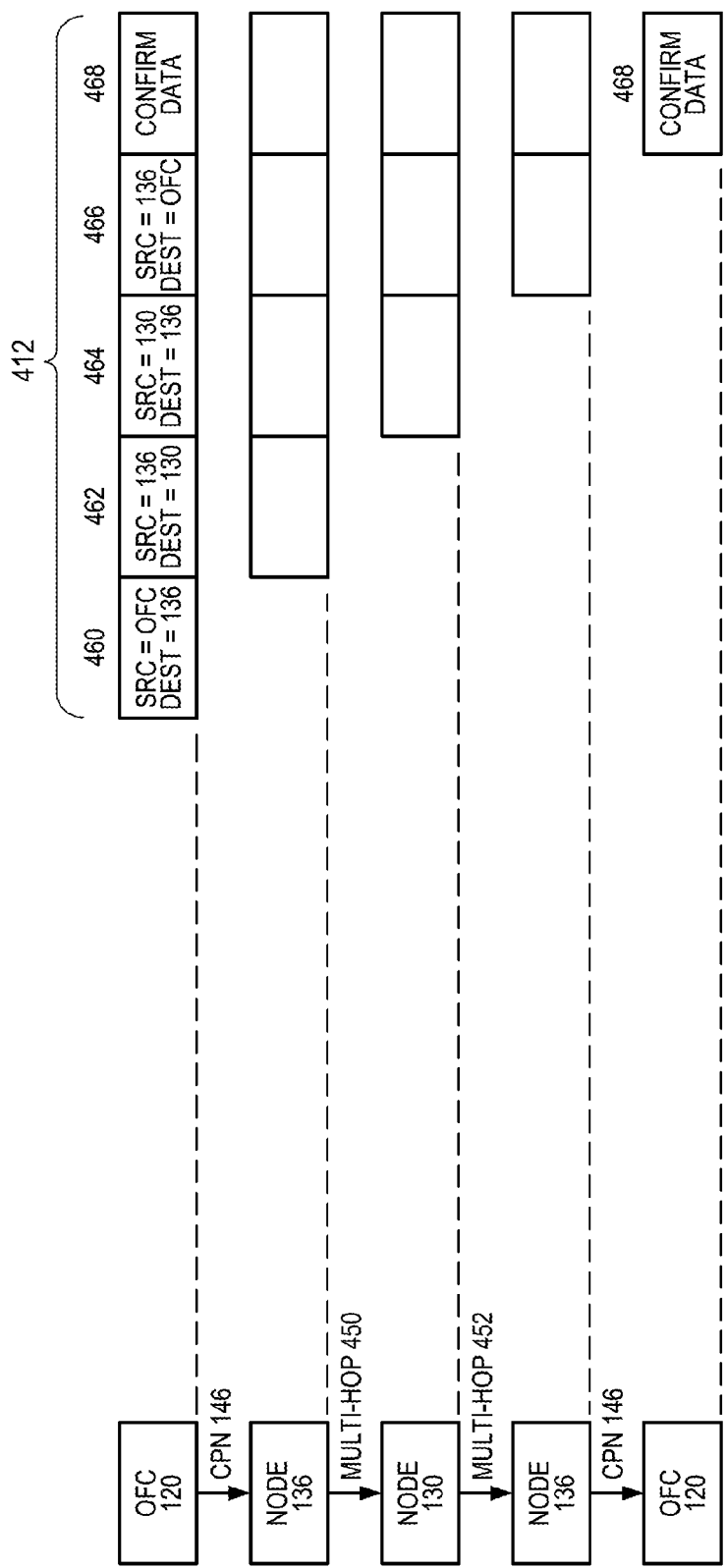
Figure 4C:
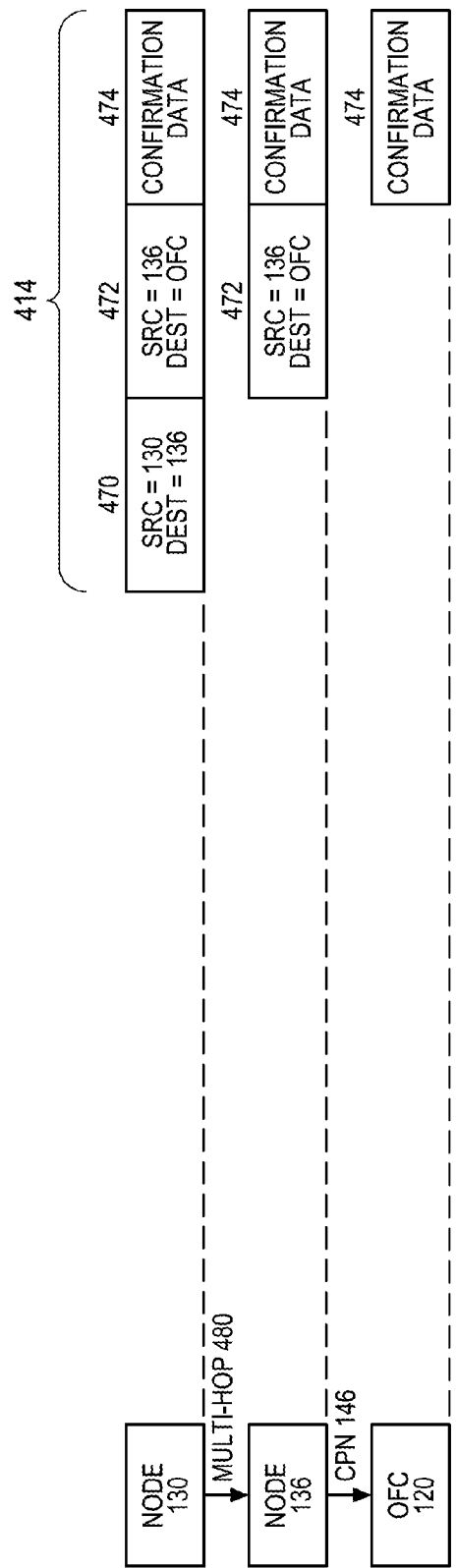

The mechanism that ensures that the encapsulated test packet is transmitted along a single prescribed network route is discussed in greater detail in relation to FIGS. 4A, 4B and 4C, and the various states of the system for testing the network connections are discussed further in relation to FIG. 6.

Figure 3:
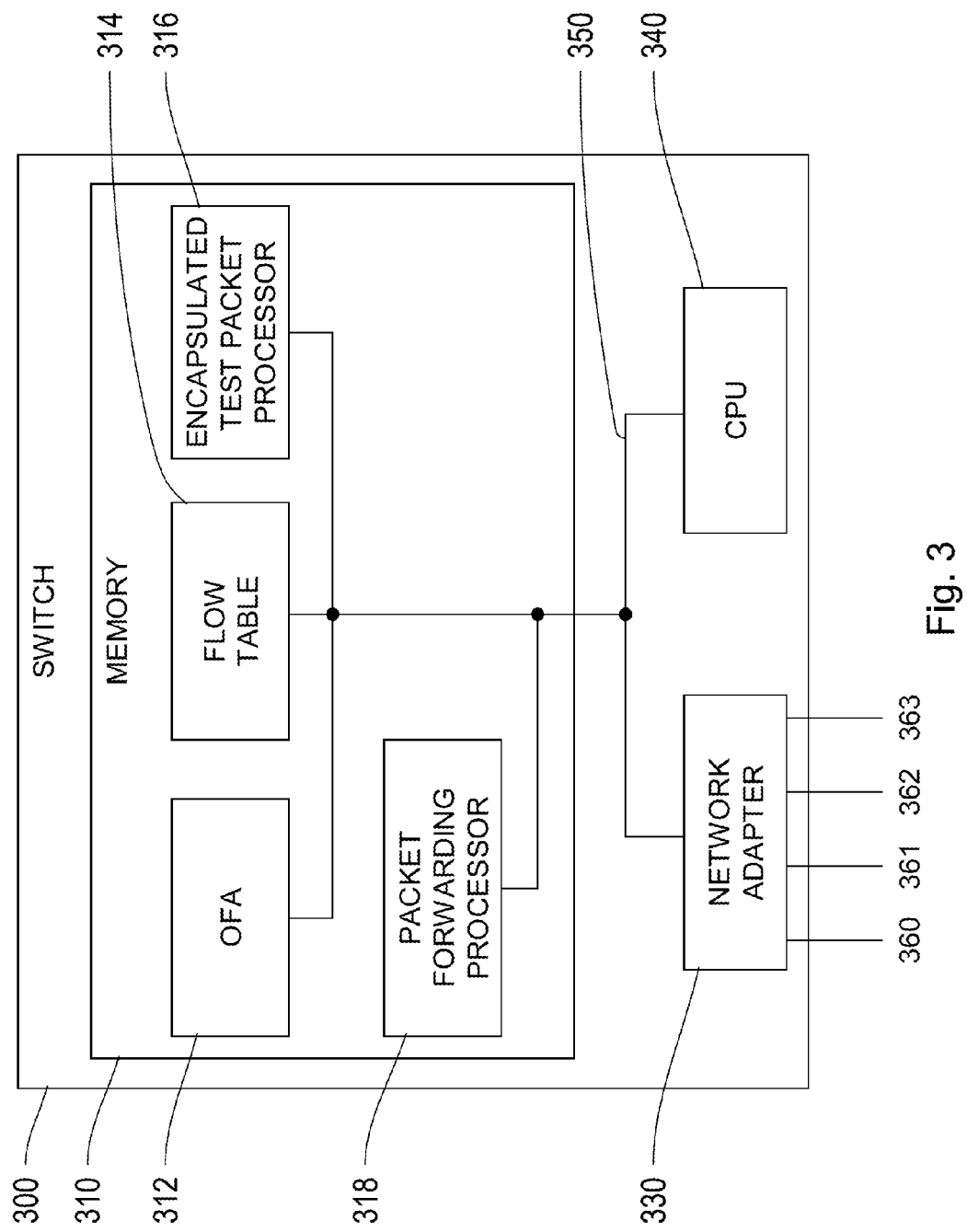
FIG. 3 is a schematic block diagram of an exemplary network switch adapted for use in a network with centralized control.

FIG. 3 is a schematic block diagram of an exemplary network switch 300 adapted for use in a centrally-controlled network, such as the centrally-controlled network 100 from FIG. 1A. In particular, FIG. 3 depicts a switch 300, a memory 310, wherein the memory 310 has an OpenFlow agent 312, a flow table 314, an encapsulated test packet processor 316, and a packet forwarding processor 318. Also depicted are a network adapter 330, and a CPU 340, connected to the memory 310 by data bus 350.

The network switch 300 is essentially a computer, adapted to transmit data between client computers in a network. The switch's 300 actions are governed by a CPU 340, which may represent a plurality of processing cores. The hardware interfaces between the switch 300 and other network nodes (switches, routers, controllers, client computers) are facilitated by the network adapter 330, wherein a network adapter 330 comprises the mechanical, electrical and signaling circuitry to connect the switch 300 to other network nodes. Network adapter 330 may represent a plurality of network adapters, and the four hardware interfaces 360-363 depicted may represent a larger array of interfaces.

Memory 310 comprises storage locations that are addressable by CPU 340 and adapters for storing software program code and data. The memory 310 may include a form of random access memory (RAM) that is generally cleared by a power cycle or other reboot operation (e.g., it is a "volatile" memory). In other embodiments, however, the memory 310 may be a non-volatile memory that does not require power to maintain information. The CPU 340 and adapters may, in turn, comprise processing elements and/or logic circuitry configured to execute the software code and manipulate the data stored in the memory 310.

An OpenFlow agent 312 allows the switch 300 to communicate with a centralized control server, such as OFC 200, and the flow table 314 stores flow entries, which associate a flow with an action. Note that a flow may be defined as multiple different things, as described by McKeown et al., OpenFlow: Enabling Innovation in Campus Networks (openflow.org, March 2008), and including, but not limited to; a transmission control protocol (TCP) connection, all the packets from a particular MAC address or IP address, all packets with the same VLAN tag, all packets from the same switch port, or all packets matching a specific header.

There are three basic actions that a switch adhering to the OpenFlow protocol are to support, again, as recited by McKeown et al., OpenFlow: Enabling Innovation in Campus Networks (openflow.org, March 2008), and which include: (1) Forwarding a flow's packets to a given port, or ports, (2) Encapsulating and forwarding a flow's packets to a controller. Typically this is used for the first packet in a new flow to allow the controller, such as OFC 200, to decide if the flow should be added to the flow table 31, and. (3) Dropping a flow's packets. Forwarding of a flow's packets is handled by the packet forwarding processor 318, wherein the packet forwarding processor 318 receives a packet, checks the destination address in the packet's header, consults the flow table 314 for instructions, and forwards the packet to a next hop address.

Upon instruction by a centralized controller, such as OFC 200, a new entry can be made in the flow table 314, which associates an action, to be carried out by switch 300, with a given flow. More particularly, a flow entry in the flow table 314 includes three fields; (1) a packet header that defines the flow, (2) an action to be carried out on the packets that make up a flow, and (3) statistics that keep track of the number of packets and bytes for each flow, and the time since the last packet matched the stored flow. This time can be used to remove inactive flows from flow table 314.

Additionally, an OFC 200 may instruct switch 300 to store entries in flow table 314 for "decapsulation" of encapsulated test packets originating from an OFC 200, wherein decapsulation refers to an instruction to strip or remove one header "stage" (explained further in relation to FIGS. 4A, 4B, and 4C) from an encapsulated test packet whose destination address matches switch's 300 gateway IP address, and forward the inner packet based on regular forwarding rules.

The systems and methods described herein also include an encapsulated test packet processor 316 in a switch 300, wherein the encapsulated test packet processor 316 is similar to an encapsulated test packet processor 218 of an OFC 200. In contrast to an OFC 200, which determines that a network node is unreachable by a CPN link, and uses an encapsulated test packet processor 218 to construct an encapsulated test packet to test whether the network node is functional on a DPN, the encapsulated test packet processor 316 of a switch 300 may be used to confirm to an OFC, such as OFC 200, that switch 300 is still operational, without being prompted to report its current operational status.

Upon not receiving a probe packet from an OFC, such as OFC 200, during a predetermined probe receipt time limit, the switch 300 may construct an encapsulated test packet using encapsulated test packet processor 316, and send the constructed encapsulated test packet for receipt by the OFC 200 to confirm that the switch 300 is operational on a DPN. Further details regarding the construction of the encapsulated test packet are given with reference to FIG. 4C.

FIG. 4A schematically depicts the use of an encapsulated test packet 410 to test a data-plane network connection. In particular, FIG. 4A relates to the network depicted in FIG. 1B, wherein the network node 130 is unreachable to the OFC 120 through the direct CPN link 140. Given this scenario, the OFC 120 uses the controlled-nodes lookup table 214 to find network node 136, which is reachable from the OFC 120. The network topology lookup table 216 is used to plot a network route between the OFC 120, and the unreachable network node 130, through the reachable node 136. FIG. 4A depicts this route as a single-hop through the CPN link 146 between OFC 120 and node 136, wherein this single-hop may alternatively be referred to as a "stage" of the network route. Subsequent stages include a single-hop though DPN link 154 between node 136 and node 134, a single-hop though DPN link 152 between node 134 and node 132, a single-hop though DPN link 150 between node 132 and node 130, a single-hop though DPN link 150 between node 130 and node 132, a single-hop though DPN link 152 between node 132 and node 134, a single-hop though DPN link 154 between node 134 and node 136, and a single-hop though CPN link 146 back to OFC 120.

The encapsulated test packet 410 depicted in FIG. 4A uses an IP-in-IP tunneling protocol, such that successive header "stages" are associated with each stage of the route between OFC 120 and network node 130, and are added to a payload, wherein the payload is a confirmation data packet 446. The encapsulated data packet is constructed with a header 430 that has its source (src) as the OFC 120, its destination (dest) as node 136, and a time-to-live (TTL) value of 2. Setting the TTL value equal to 2 ensures that if the encapsulated data packet takes any route other than that prescribed, it is discarded before reaching the node 130, and the payload confirmation data will not be returned to the OFC 120. This is due to the fact that the TTL value is decremented by 1 at each network node that the packet arrives at. If the TTL value is decremented to a value of 0, the packet is discarded. The encapsulated test packet 410 may be sent from OFC 120 to node 136 over CPN link 146 using the packet out command of the OpenFlow protocol used by the OFC 120.

Header 432 corresponds to the second stage of the route, with its source as node 136, its destination as node 134, and TTL value as 2. Header 434 represents the third stage of the route, and has its source as node 134, destination as node 132, and TTL value of 2. Header 436 represents the fourth stage of the route, having its source as node 132, destination as unreachable node 130, and TTL value of 2. Header 438 corresponds to the fifth stage, with source as node 130 and destination as node 132 such that the encapsulated test packet is beginning its journey back to the OFC 120. Header 440 corresponds to the sixth stage, with source as node 132 and destination as node 134. Header 442 corresponds to the seventh stage, with source as node 134 and destination as node 136, and header 444 corresponds to the eight stage of encapsulated test packet 410, with source as node 136 and destination as OFC 120.

Upon receiving the encapsulated test packet 410 back at node 136, wherein the header has a source of network node 136 and destination as OFC 120, network node 136 does not know how to forward the encapsulated test packet 410, since OFC 120 is not recognized as a destination on the DPN. In response, network node 136 will pass the encapsulated test packet 410 to the OFC 120 as an exception packet across CPN link 146, using the packet-in command of the OpenFlow protocol, as recited by openflow.org. OFC 120, however, will recognize encapsulated test packet 410 and the confirmation data 446.

FIG. 4A schematically depicts how, after each hop of the network route from OFC 120 to network node 130, a stage of the encapsulated headers (430, 432, 434, 436, 438, 440, 442, and 444) is discarded. After the eight stages of the network route, all eight headers (430, 432, 434, 436, 438, 440, 442, and 444) have been discarded, leaving the confirmation data packet 446, to be received in the OFC 120 by the confirmation packet processor 220. Receipt of this confirmation data packet 446 by the confirmation packet processor 220 confirms that the encapsulated test packet 410 successfully travelled the predetermined network route between OFC 120, and the network node 130, which is unreachable by direct CPN link 140. This confirms that the network node 130 is still operational on the DPN, and allows the OFC 120 to delay removing node 130 from the network routes in the network topology lookup table 216.

FIG. 4B depicts an alternative encapsulated test packet 412 to the encapsulated test packet 410 from FIG. 4A. In FIG. 4B, encapsulated test packet 412 is constructed to verify whether an unreachable network node 130 is still functional on the DPN. In contrast to the encapsulated test packet 410 from FIG. 4A, the encapsulated test packet 412 differs in that it is not required to travel by a specific route between a reachable network node, and the unreachable network node 130.

Upon determining by an OFC 120 that a network node 130 is not reachable by the CPN link 140, the OFC 120, and specifically, the encapsulated test packet processor 218 within the OFC 120, constructs the encapsulated test packet 412 to route through reachable network node 136, wherein network node 136 is found to have an operational CPN link 146 from the controlled-nodes lookup table 214. Encapsulated test packet 412 is constructed such that it has a first header 460, corresponding to a first stage of the route, with source as OFC 120 and destination as network node 136, and communicated though CPN link 146. Header 462 corresponds to a second stage of the route, with source as node 136 and destination as node 130. This corresponds to a multi-hop route 450, wherein the exact route between nodes 136 and 130 will be unknown, and decided upon by the network nodes between node 136 and node 130. This multi-hop route 450 will have a TTL value set to a predetermined default, which may be 100, to ensure that it is not passed between nodes indefinitely if node 130 is unreachable by the DPN. Note that this example is based on the simplified DPN from FIG. 1B, wherein only two network nodes (134 and 132) are depicted between nodes 136 and 130, however this DPN may consist of a more complicated network of network nodes, wherein each node may be able to communicate a packet using a plurality of network routes, and the route chosen may change according to network traffic conditions.

Header 464 corresponds to a third stage of the route, with source as node 130 and destination as node 136 such that the encapsulated test packet 412 is returned to node 136 by a multi-hop route 452, which may or may not be the same as multi-hop route 450. Finally, header 466 corresponds to a fourth stage of the route, with source as node 136 and destination as OFC 120. Upon receiving the encapsulated test packet 412 back at node 136, wherein the header has a source of network node 136 and destination as OFC 120, network node 136 does not know how to forward the encapsulated test packet 412, since OFC 120 is not recognized as a destination on the DPN. In response, network node 136 will pass the encapsulated test packet 412 to the OFC 120 as an exception packet across CPN link 146, using the packet-in command of the OpenFlow protocol, as recited by openflow.org. OFC 120, however, will recognize encapsulated test packet 412 and the confirmation data 468.

It is further noted that a combination of the methods used to construct encapsulated test packet 410 and encapsulated test packet 412 may be used, wherein an exact route, from which no deviation is allowed, is used to communicate from an OFC 120 to an unreachable node 130, as per the construction of the encapsulated test packet 410, and an inexact route is employed to return a confirmation packet from the unreachable node 130 to the OFC 120, as per the construction of encapsulated test packet 412.

FIG. 4C schematically depicts the use of an encapsulated test packet 414 to inform a controller that a network node 130 is still active. The encapsulated test packet 414 may be constructed by a network node, such as node 130 from FIG. 1B, in response to node 130 not receiving a probe packet from a centralized controller, such as OFC 120 from FIG. 1B, during a predetermined probe receipt time limit, and due to a failure in the CPN between the network node 130 and the OFC 120 through CPN link 140. In this way, the network node 130 is attempting to communicate to the centralized controller that it is still operational on the DPN, and the encapsulated test packet 414 may alternatively be referred to as a keep-alive message.

Network node 130 may be a network switch, and have a construction similar to switch 300 from FIG. 3. In this implementation, the encapsulated test packet 414 may be constructed by encapsulated test packet processor 316. Network node 130 does not know which of the network nodes on the DPN have an active CPN connection to the OFC 120. In response, the network node 130 may construct, using the encapsulated test packet processor 316, multiple encapsulated test packets, wherein the multiple test packets are routed through multiple peer network nodes on the DPN to try and send a keep-alive message back to the OFC 120. Encapsulated test packet 414 is one example of the multiple encapsulated test packets that the network node 130 may construct, wherein network node 130 routes encapsulated test packet 414 through network node 136, and network node 136 was randomly chosen as one of the peer network nodes in a flow table, such as flow table 314, of network node 130. In this instance, network node 136 does have an active CPN link 146 to OFC 120.

Encapsulated test packet 412 is constructed with two header stages. Header stage 470 directs the encapsulated test packet 412 along a multi-hop route 460 with source as network node 130 and destination as network node 136, wherein the exact route between network node 130 and network node 136 does not matter. Header stage 472 has its source as network node 136 and destination as the OFC 120, and when received at network node 136, network node 136 will not recognize OFC 120 as a DPN destination. In response, network node 136 will pass the encapsulated test packet 412 to the OFC 120 as an exception packet across CPN link 146, using the packet-in command of the OpenFlow protocol, as recited by openflow.org. OFC 120, however, will recognize encapsulated test packet 412 and the confirmation data 474.

The encapsulated data packet 412, and in particular, the confirmation data packet 474, is received by an OFC 120 processor, such as the encapsulated test packet processor 218 of FIG. 2. Upon receipt of confirmation data packet 474, a timestamp is stored in the controlled-nodes lookup table 214 in an OFC, such as OFC 120, and associated with the network node 130, and wherein this timestamp is used to determine the time since the last successful communication with a the respective network node, and to delay the network node 130 from being flagged as inoperable in the controlled nodes lookup table 214.

Figure 5:
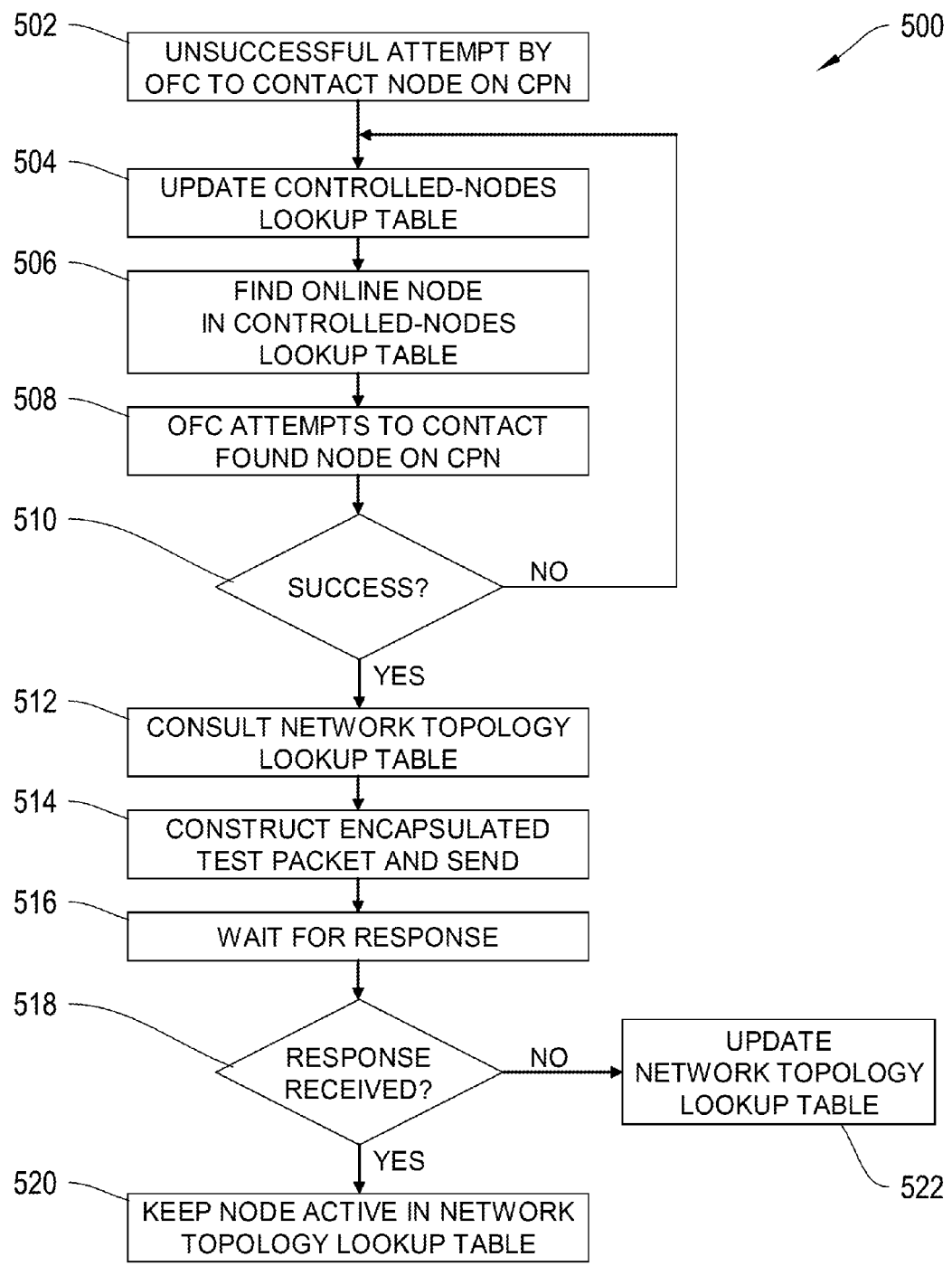
FIG. 5 is a flowchart diagram of a process for testing a centrally-controlled network.

Having described certain implementations, it will now be understood that the systems and methods described herein include certain processes, including the process 500 depicted in FIG. 5. In particular, FIG. 5 depicts a flowchart diagram of a process 500 for testing a centrally-controlled network. Process 500 begins at step 502 with an unsuccessful attempt by an OFC, such as OFC 200 from FIG. 2, to communicate with a given network node through the CPN link between that network node and the OFC. In response, and at step 504, the OFC flags the network node as unreachable in a controlled-nodes lookup table within the OFC. This flagging implies that while the network node is unreachable through the direct CPN link between the OFC and the network node, the network node may still be operational on the DPN, and be able to transfer data packets between other network nodes.

In order to test whether the unreachable network node is still operational on the DPN, the process proceeds to step 506, wherein the OFC finds a new network node in the controlled-nodes lookup table that is still marked as having an active CPN link to the OFC. The OFC attempts to communicate with this new network node at step 508, and checks if this communication attempt was successful at checkpoint 510. If communication was unsuccessful after one, or a predetermined number of attempts, the process loops back to step 504 and the new network node is marked as unreachable in the controlled-nodes lookup table. If the communication was successful at checkpoint 510, the process proceeds to step 512, wherein a network route between the OFC and the unreachable node is found using a network topology lookup table.

Step 514 includes the construction and transmission of an encapsulated test packet along the network route found in step 512. Step 516 involves the process 500 waiting a predetermined amount of time for a confirmation data packet to be returned from the unreachable network node, wherein the confirmation data packet would confirm that the unreachable network node is still operational on the DPN.

Checkpoint 518 tests for receipt of a confirmation data packet from the unreachable network node, wherein if a confirmation data packet is received, the process proceeds to step 520, and the unreachable network node is retained as an active node on the DPN in a network topology lookup table. If the result of checkpoint 518 is that no confirmation data packet is received, the process proceeds to step 522, and the OFC updates the network topology table to isolate the unreachable network node, excluding it from use in network routing.

FIG. 6 is a state-transition diagram 600 for a centrally-controlled network that uses encapsulated test packets to test network connections. The network may be the OpenFlow network 100, wherein CPN links 140, 142, 144 and 146 represent a CPN, and DPN links 150, 152, and 154 represent a DPN. State 602 represents network 100 after connectivity between OFC 120 and network nodes 130, 132, 134, and 136 has been initialized using CPN links 140, 142, 144, and 146 respectively. Transition 604 leads to state 606, wherein state 606 indicates that a network node, such as network node 130 from FIG. 1A is reachable by the CPN. Transition 608 represents the scenario where CPN connectivity between network node 130 and OFC 120 across CPN link 140 is found to be non-functional. In response, the OFC 120 may test to establish whether network node 130 is still operational on the DPN. OFC 120 may perform this test using one or more encapsulated test packets. If it is found that network node 130 is still functional on the DPN, the diagram 600 makes transition 608 to state 610, wherein at state 610 network node 130 is unreachable, but OFC 120 will delay removing it from DPN network routes. If CPN connectivity to network node 130 is restored before a timeout period has elapsed, then transition 618 is followed back to state 606. If, however, CPN connectivity is not restored to network node 130 before a timeout period has elapsed, then transition 612 is followed to state 616, wherein network node is flagged as inoperable in the controlled-nodes lookup table 214 of the OFC 120, and removed from DPN routes in the network topology lookup table 216, which is subsequently used to used routes of network nodes, such as network nodes 132, 134, and 136. Alternatively, transition 614 can be made directly from state 606 to state 616 if the encapsulated test packets fail to confirm that network node 130 is still operational on the DPN. While inoperable, CPN connectivity may be restored to network node 130, and transition 620 back to state 606 may also occur.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those skilled in the art will know or be able to ascertain using no more than routine experimentation, many equivalents to the implementations and practices described herein. For example, where reference is made to a control-plane network (CPN) connection between a centralized controller (OFC), and a network node, and a data-plane network (DPN) connection between two or more network nodes, it will be understood that the systems and methods may be described with reference to any network environment in which there are two or more sub-networks, and wherein at least two of the sub-networks are partially or fully independent from one another, and network communication can continue on a second sub-network when part, of all, of a first sub-network in inoperable. In such instances, the systems and methods described herein would allow for verification of network connectivity on the second sub-network when part of the first sub-network is inoperable.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A system for testing network connections of a centrally-controlled network, the system comprising:
   a plurality of network nodes controlled by a controller, the plurality of network nodes including at least a first network node having a first control connection with the controller and a second network node having a second control connection with the controller;
   wherein the first network node is configured to:
      construct, responsive to determining that the controller is unreachable by the first network node through the first control connection, a plurality of encapsulated test packets corresponding to a plurality of network paths, each encapsulated test packet containing a confirmation data packet; and
      transmit the plurality of encapsulated test packets along the respective corresponding network paths; and
   wherein the second network node is configured to receive the confirmation data packet contained in an encapsulated test packet and forward the confirmation data packet to the controller using the second control connection.

2. The system of claim 1, wherein the plurality of encapsulated test packets includes at least (i) a first encapsulated test packet corresponding to a first network path that includes the second network node, and (ii) a second encapsulated test packet corresponding to a second network path that does not include the second network node.

3. The system of claim 1, wherein the confirmation data packet confirms to the controller that the first network node is operational.

4. The system of claim 1, comprising the controller, wherein the controller is configured to determine that the first network node is unreachable through the first control connection, and to test, responsive to determining that the first network node is unreachable, for receipt of the confirmation data packet.

5. The system of claim 4, wherein the controller is configured to update a network topology table, responsive to receiving the confirmation data packet within a predetermined amount of time, to retain the first network node as active for use in network routing.

6. The system of claim 4, wherein the controller is configured to update a network topology table, responsive to determining that no confirmation data packet has been received from the first network node within a predetermined amount of time, to identify the first network node as unreachable, excluding the first network node from use in network routing.

7. The system of claim 1, comprising the controller, wherein the controller is configured to store, in a controlled-nodes lookup table, responsive to receiving the confirmation data packet, a timestamp associated with the first network node.

8. The system of claim 7, wherein the controller is configured to determine, responsive to determining that the first network node is unreachable, that the timestamp associated with the first network node in the controlled-nodes lookup table is within a predetermined amount of time, and to retain the first network node as active for use in network routing.

9. The system of claim 7, wherein the controller is configured to determine, responsive to determining that the first network node is unreachable, that the timestamp associated with the first network node in the controlled-nodes lookup table is not within a predetermined amount of time, and to update a network topology table to identify the first network node as unreachable, excluding the first network node from use in network routing.

10. The system of claim 1, wherein the first network node is configured to transmit the encapsulated test packets using a tunneling protocol.

11. A method for testing network connections of a centrally-controlled network, the method comprising:
    determining, by a first network node in a plurality of network nodes controlled by a controller, that the controller is unreachable by the first network node through a first control connection between the controller and the first network node;
    constructing, by the first network node, responsive to determining that the controller is unreachable by the first network node through the first control connection, a plurality of encapsulated test packets corresponding to a plurality of network paths, each encapsulated test packet containing a confirmation data packet;
    transmitting, by the first network node, the plurality of encapsulated test packets along the respective corresponding network paths;
    receiving, by a second network node having a second control connection with the controller, the confirmation data packet contained in an encapsulated test packet; and
    forwarding, by the second network node, the confirmation data packet to the controller using the second control connection.

12. The method of claim 11, the plurality of encapsulated test packets including at least (i) a first encapsulated test packet corresponding to a first network path that includes the second network node, and (ii) a second encapsulated test packet corresponding to a second network path that does not include the second network node.

13. The method of claim 11, the confirmation data packet confirming to the controller that the first network node is operational.

14. The method of claim 11, comprising determining, by the controller, that the first network node is unreachable through the first control connection, and testing for receipt of the confirmation data packet responsive to determining that the first network node is unreachable.

15. The method of claim 14, comprising updating a network topology table, responsive to receiving the confirmation data packet within a predetermined amount of time, to retain the first network node as active for use in network routing.

16. The method of claim 14, comprising updating a network topology table, responsive to determining that no confirmation data packet has been received from the first network node within a predetermined amount of time, to identify the first network node as unreachable, excluding the first network node from use in network routing.

17. The method of claim 11, comprising storing in a controlled-nodes lookup table, responsive to receiving the confirmation data packet, a timestamp associated with the first network node.

18. The method of claim 17, comprising determining, responsive to determining that the first network node is unreachable, that the timestamp associated with the first network node in the controlled-nodes lookup table is within a predetermined amount of time, and retaining the first network node as active for use in network routing.

19. The method of claim 17, comprising determining, responsive to determining that the first network node is unreachable, that the timestamp associated with the first network node in the controlled-nodes lookup table is not within a predetermined amount of time, and updating a network topology table to identify the first network node as unreachable, excluding the first network node from use in network routing.

20. The method of claim 11, comprising transmitting, by the first network node, the encapsulated test packets using a tunneling protocol.

* * * * *